US012585454B2

(12) United States Patent
Ballard et al.

(10) Patent No.: US 12,585,454 B2
(45) Date of Patent: Mar. 24, 2026

(54) MANAGEMENT CONTROLLER FIRMWARE UPDATES FOR INFORMATION HANDLING SYSTEM (IHS) COMPONENT WITHOUT A DIRECT OUT-OF-BAND (OOB) MANAGEMENT CHANNEL

(71) Applicant: Dell Products, L.P., Round Rock, TX (US)

(72) Inventors: Lee E. Ballard, Georgetown, TX (US); Deepaganesh Paulraj, Bangalore (IN); Jason B. Kilpatrick, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 18/333,740

(22) Filed: Jun. 13, 2023

(65) Prior Publication Data

US 2024/0419427 A1 Dec. 19, 2024

(51) Int. Cl.
*G06F 9/44* (2018.01)
*G06F 8/61* (2018.01)
(Continued)

(52) U.S. Cl.
CPC ............... *G06F 8/65* (2013.01); *H04L 63/18* (2013.01)

(58) Field of Classification Search
CPC . G06F 8/65; G06F 8/63; G06F 9/4401; G06F 11/1433; G06F 8/654; G06F 13/4295; G06F 9/45558; G06F 9/44505; G06F 8/71; G06F 8/62; G06F 1/20; G06F 1/206; G06F 1/3296; G06F 1/3215; G06F 13/4221; G06F 1/3287; G06F 1/3278; G06F 1/3209;
(Continued)

(56) References Cited

U.S. PATENT DOCUMENTS

| 9,875,093 B2 * | 1/2018 | Li | ............................. G06F 8/65 |
| 2004/0073830 A1 * | 4/2004 | Coteus | .................. H04L 7/0338 |
| | | | 714/2 |

(Continued)

OTHER PUBLICATIONS

DMTF association, Redfish Firmware Update White Paper, 28 pages (Year: 2021).*

(Continued)

*Primary Examiner* — Thuy Dao
(74) *Attorney, Agent, or Firm* — Fogarty LLP

(57) ABSTRACT

Systems and methods for management controller firmware updates for an Information Handling System ("IHS") component without a direct out-of-band management channel are described. In an illustrative, non-limiting embodiment, an IHS may include a host system, a management controller ("MC") configured to provide out-of-band management of the IHS, and a network interface controller ("NIC") coupled to the MC, where the NIC comprises a baseboard management controller ("BMC") coupled to a processing unit, where the NIC BMC does not have a direct out-of-band management channel, or the NIC BMC does have a direct out-of-band management channel but the channel is unavailable, and where the MC is configured to: obtain a firmware update image usable by the NIC BMC; and transmit the firmware update image to the processing unit, wherein the processing unit is configured to transmit the firmware update image to the NIC BMC.

19 Claims, 9 Drawing Sheets

(51) Int. Cl.

| | |
|---|---|
| *G06F 8/65* | (2018.01) |
| *G06F 8/654* | (2018.01) |
| *G06F 8/71* | (2018.01) |
| *G06F 9/455* | (2018.01) |
| *G06F 15/16* | (2006.01) |
| *G06F 21/57* | (2013.01) |
| *H04L 9/40* | (2022.01) |

(58) Field of Classification Search
CPC . G06F 1/324; G06F 1/26; H04L 63/18; H04L 41/082; H04L 67/34
See application file for complete search history.

(56) References Cited

U.S. PATENT DOCUMENTS

| | | | | |
|---|---|---|---|---|
| 2005/0192929 | A1* | 9/2005 | Sumi | G06F 9/4488 |
| 2017/0150378 | A1* | 5/2017 | Dumov | H04W 4/18 |
| 2020/0322285 | A1* | 10/2020 | Franza | H04L 69/40 |
| 2023/0119437 | A1* | 4/2023 | Faasse | G06F 1/3278 |
| | | | | 713/300 |

OTHER PUBLICATIONS

Deepaganesh Paulraj, et al., "Secure Smart Network Interface Controller Firmware Update," U.S. Appl. No. 17/730,720, filed Apr. 27, 2022.

\* cited by examiner

MANAGEMENT CONTROLLER FIRMWARE UPDATES FOR INFORMATION HANDLING SYSTEM (IHS) COMPONENT WITHOUT A DIRECT OUT-OF-BAND (OOB) MANAGEMENT CHANNEL

FIELD

This disclosure relates generally to Information Handling Systems (IHSs), and more specifically, to systems and methods for firmware updates of a network interface controller (NIC) without an out-of-band (OOB) management channel. Some embodiments provide systems and methods for firmware updates of a baseboard management controller (BMC) of the NIC, where the BMC does not have a direct out-of-band (OOB) management channel.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may include software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may include any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may include a smart network interface card or "SmartNIC." The SmartNIC may include a data processing unit (DPU), which may offer capabilities not found in traditional NICs. Further, it should be noted that some embodiments may operate on devices other than SmartNICs. For example, graphics processing units (GPUs), infrastructure processing units (IPUs), and other types of accelerators and smart devices may benefit from the ability to deploy an OS as described herein.

A SmartNIC may act as a system within a system, including its own Unified Extensible Firmware Interface ("UEFI") Basic Input/Output System ("BIOS"), its own management controller such as a baseboard management controller ("BMC"), and its own operating system ("OS") such as ESXio or any other suitable OS.

SmartNICs may also include one or more firmware devices (e.g., a NIC firmware for controlling networking functions of the SmartNIC, a BMC firmware for controlling a management controller of the SmartNIC, a UEFI firmware such as an ARM UEFI firmware for controlling a pre-boot environment of the SmartNIC, etc.), which may need to be updated from time to time. An approach based on UEFI Firmware Management Protocol (FMP) is sometimes used to update components, but there are some SmartNIC devices which do not support FMP. Accordingly, it would be advantageous to have a method for updating the firmware(s) of the various information handling resources that are components of such SmartNICs.

Further, a SmartNIC device may include components that need different types of activation for performing various inventory and/or firmware updates. If such firmware updates are performed via FMP, then it may be necessary or advisable to perform a reboot of the host system each time an update occurs in order to avoid various possible hangs, crashes, or other issues that may occur without a reboot. Thus it may not be possible or advisable, using existing methods, to perform firmware updates in parallel from the host management controller. Serializing the updates is more time-intensive, but it avoids various issues (e.g., attempts to access a firmware image simultaneously by multiple processes, dead-lock situations, etc.). Accordingly, this disclosure provides improved techniques for performing firmware updates of components of a SmartNIC, in some embodiments.

It should be noted that the discussion of a technique in the Background section of this disclosure does not constitute an admission of prior-art status. No such admissions are made herein, unless clearly and unambiguously identified as such.

SUMMARY

Systems and methods for management controller firmware updates for an Information Handling System ("IHS") component without a direct out-of-band management channel are described. In accordance with the teachings of the present disclosure, the disadvantages and problems associated with updating firmware in a NIC or SmartNIC may be reduced or eliminated.

In an illustrative, non-limiting embodiment, an IHS may include a host system, a management controller ("MC") configured to provide out-of-band management of the IHS, and a network interface controller ("NIC") coupled to the MC, where the NIC includes a baseboard management controller ("BMC") coupled to a processing unit, where the NIC BMC does not have a direct out-of-band management channel, or the NIC BMC does have a direct out-of-band management channel but the channel is unavailable, and where the MC is configured to: obtain a firmware update image usable by the NIC BMC; and transmit the firmware update image to the processing unit, where the processing unit is configured to transmit the firmware update image to the NIC BMC.

In some embodiments, the MC includes a first out-of-band (OOB) management connection. In some embodiments, the NIC further includes a second OOB management connection, and where the second OOB management connection is unavailable. In some embodiments, the network interface controller is a SmartNIC.

In some embodiments, the IHS further includes a serial connection between the MC and the NIC BMC, where a transmission of the firmware update image to the NIC BMC via the processing unit is faster than a transmission of the firmware update image to the NIC BMC via the serial connection. In some embodiments, the MC is further configured to provide a utility operating system image to the processing unit, where the processing unit boots from the utility operating system image, and where the utility operating system image includes the firmware update image.

In some embodiments, the processing unit is configured to start a file server hosted by the processing unit. In some embodiments, the processing unit is configured to instruct the NIC BMC to retrieve the firmware update image from the file server. In some embodiments, the MC is further configured to instruct the NIC BMC to retrieve the firmware update image from the file server.

In some embodiments, the MC is further configured to: reboot the processing unit into a Unified Extensible Firmware Interface (UEFI) mode; and create a job for the UEFI mode of the processing unit to download the firmware update image, and to update the NIC BMC. In some embodiments, the MC is configured to: reboot the processing unit into a Unified Extensible Firmware Interface (UEFI) mode; configure the processing unit as a router between the MC and the NIC BMC; and instruct the NIC BMC to transfer the firmware update image from the MC via the router.

In some embodiments, the firmware update image is retrieved from a host system. In some embodiments, the firmware update image is retrieved from an external IHS via a network share. In some embodiments, the firmware includes at least one of: (a) network interface controller firmware configured to control networking functionality of the network interface controller; (b) BMC firmware configured to control an internal management controller of the network interface controller; or (c) Unified Extensible Firmware Interface firmware configured to control a pre-boot environment of the NIC. In some embodiments, the MC is further configured to publish a location of the firmware update image via Dynamic Host Configuration Protocol version 6 (DHCPv6).

In another illustrative, non-limiting embodiment, a method includes: obtaining, at a processing unit of a Network Interface Controller (NIC), a firmware update image from a management controller (MC) of an Information Handling System (IHS) to which the NIC is coupled; and transmitting, from the processing unit to a baseboard management controller (BMC) of the NIC, the firmware update image.

In some embodiments, the method further includes: obtaining, by the NIC BMC, the firmware update image from the processing unit of the NIC; and applying, by the NIC BMC, the firmware update image, the firmware update image being configured to install an update to the firmware of the NIC BMC. In some embodiments, the method further includes: obtaining, by the processing unit of the NIC, a utility operating system image from the MC; and booting, by the processing unit of the NIC, from the utility operating system image, where the utility operating system image includes the firmware update image.

In another illustrative, non-limiting embodiment, a non-transitory, computer-readable medium has programming instructions thereon that upon execution by a Baseboard Management Controller (BMC) of a Network Interface Controller (NIC), causes the BMC to: obtain a firmware update image from a processing unit of the NIC, where the processing unit is configured to receive the firmware update image from a management controller (MC) of an Information Handling System (IHS) to which the NIC is coupled; and install the firmware update image.

In some embodiments the processing unit of the NIC obtains a utility operating system image from the MC, where the processing unit of the NIC boots from the utility operating system image, and where the utility operating system image includes the firmware update image.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
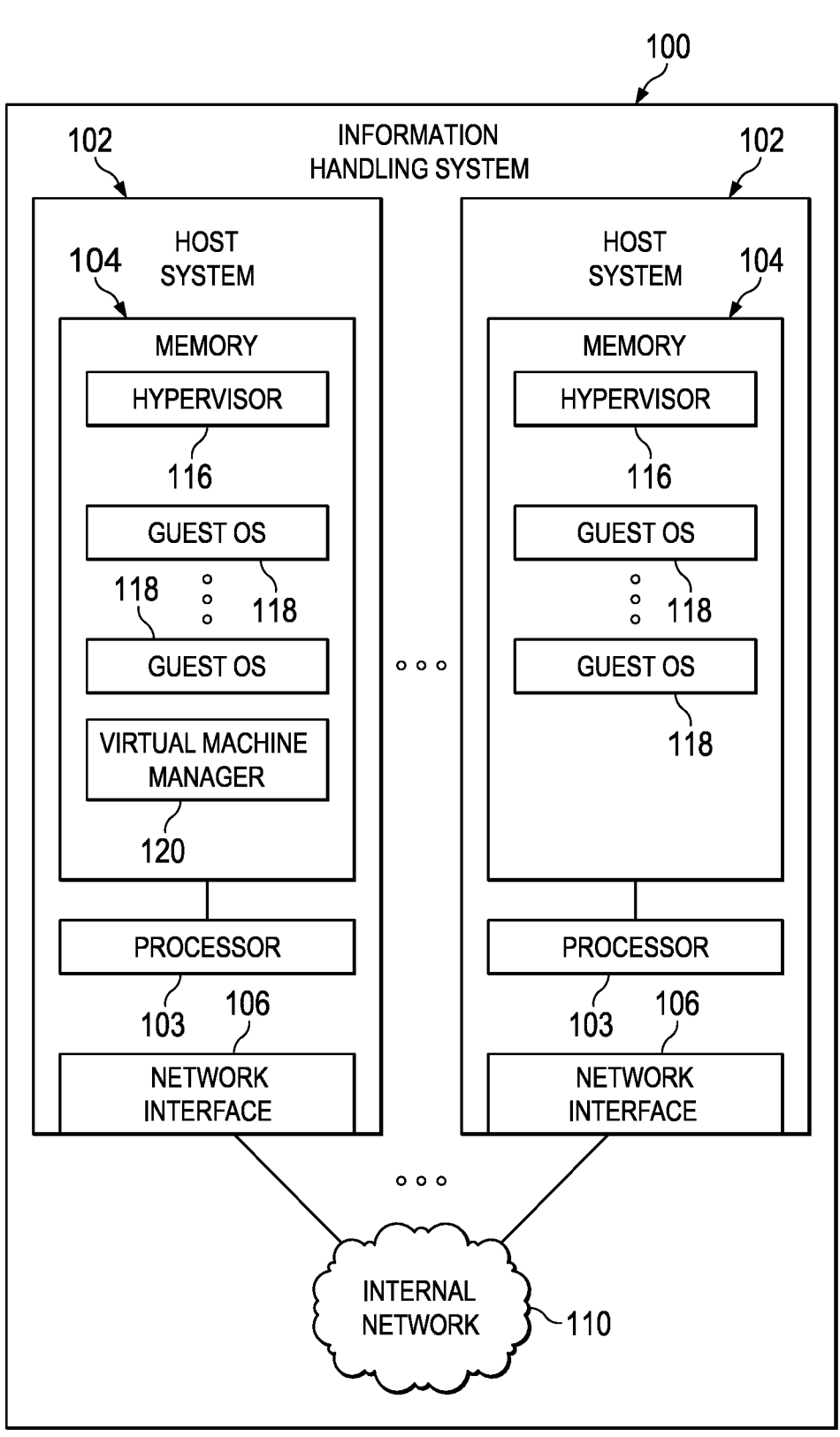
FIG. 1 illustrates a block diagram of selected components of an example information handling system, in accordance with embodiments of the present disclosure.

Preferred embodiments and their advantages are best understood by reference to FIGS. 1 through 8, where like numbers are used to indicate like and corresponding parts.

For the purposes of this disclosure, the term "information handling system" (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may include a server (e.g., embodied in a "sled" form factor). In these and other embodiments, a host system 102 may include a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may include any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may include software and/or firmware generally operable to allow multiple virtual machines and/or operating systems to run on a single computing system (e.g., an information handling system 100) at the same time. This operability is generally allowed via virtualization, a technique for hiding the physical characteristics of computing systemresources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may include a specially-designed OS with native virtualization capabilities. In another embodiment, a hypervisor 116 may include a standard OS with an incorporated virtualization component for performing virtualization.

In another embodiment, a hypervisor 116 may include a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may include any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may include a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may include software and/or firmware generally operable to manage individual hypervisors 116 and the guest OSes 118 instantiated on each hypervisor 116, including controlling migration of guest OSes 118 between hypervisors 116.

Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may include one or more suitable NICs, including without limitation, mezzanine cards, network daughter cards, etc.

In some embodiments, a network interface 106 may include a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may provide techniques for performing firmware updates of various information handling resources of network interface controller 106, which may be a SmartNIC device. Some embodiments may employ Redfish®, which is a communications standard designed to deliver simple and secure management functionality that is supported by many management controllers. Other embodiments may use different communications standards, but the example of Redfish® is discussed in detail herein for the sake of clarity and concreteness.

Figure 2:
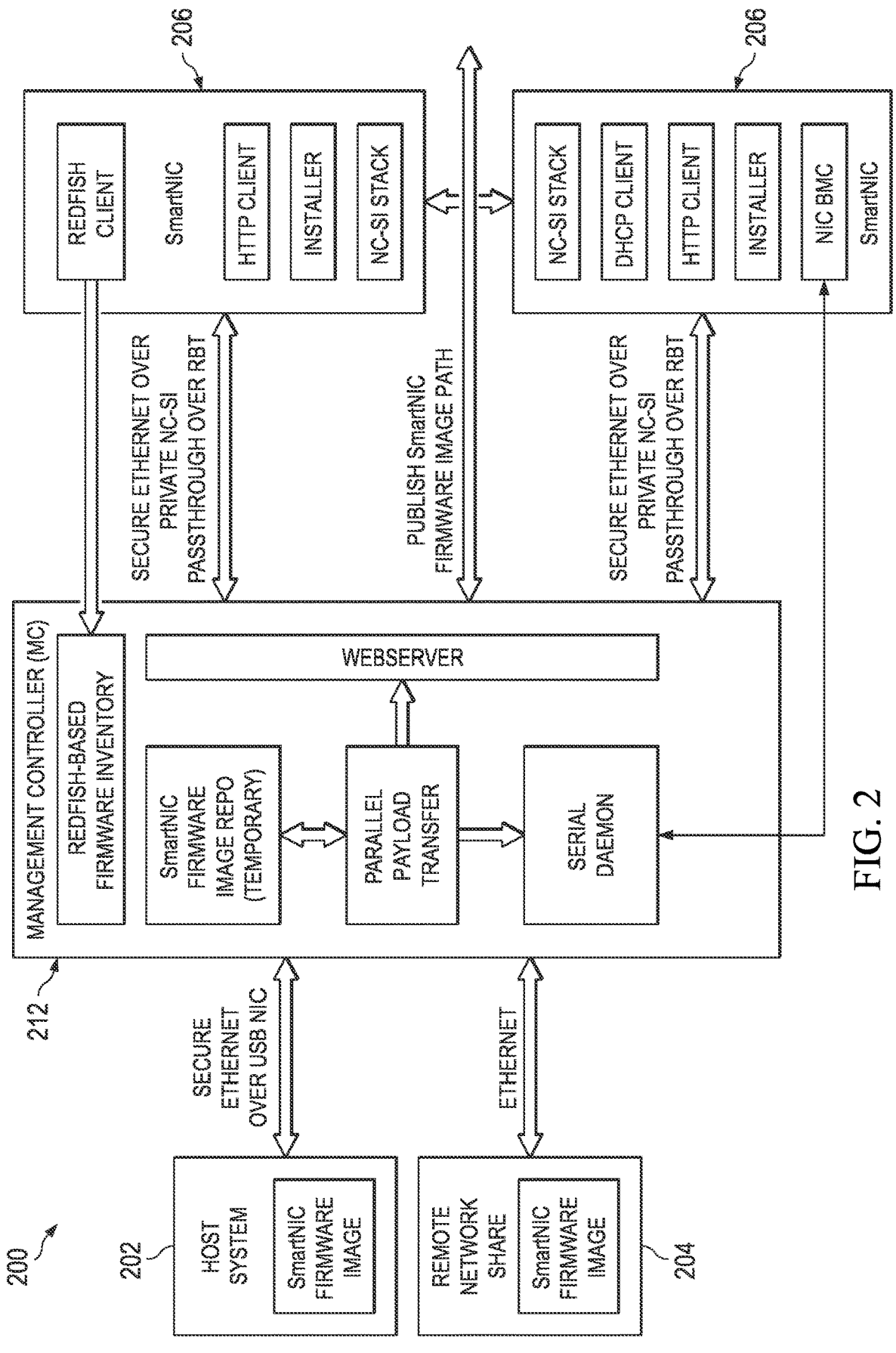
FIG. 2 illustrates a block diagram of selected components of an example information handling system depicting a management controller connectivity with a plurality of SmartNICs, in accordance with embodiments of the present disclosure.

Turning now to FIG. 2, a block diagram of selected components of an information handling system 200 is shown, according to some embodiments. Information handling system 200 may include host system 202, management controller 212, and one or more SmartNICs 206. Information handling system 200 may further include or be communicatively coupled to remote network share 204. SmartNICs 206 may each include various information handling resources, any or all which may include a firmware that may need to be updated from time to time.

Host system 202 may be coupled to the hardware of SmartNICs 206 via a communication channel such as Peripheral Component Interconnect Express (PCIe) in some embodiments. Management controller 212 may be coupled to host system 202 via one or more communication channels, such as Ethernet over USB NIC, a system management bus (SMBus), etc.

Management controller 212 may be coupled to SmartNICs 206 via a network controller sideband interface (NC-SI), which may be established over reduced media-independent interface (RMII) based transport (RBT), over PCIe vendor-defined message (VDM), over SMBus, etc.

Embodiments of this disclosure may use firmware updates that are packaged according to a standardized update package payload. For example, Dell® may provide such updates in a Dell Update Package (DUP) format. Other systems may use other formats, as one of ordinary skill in the art with the benefit of this disclosure will appreciate. The update packages may be received from host system 202 and/or from remote network share 204.

According to one embodiment, management controller 212 may perform a firmware inventory of the different components (not shown separately) of SmartNICs 206. Management controller 212 may then provide firmware payload transfer and activation in parallel based on the types of the components. The SmartNIC firmware inventory may be collected based on the component type via Redfish or NC-SI in some embodiments. As shown, the payloads may be temporarily stored in a repository at management controller 212. Payloads may then be transferred via NC-SI pass-through ("PT") private channel, a serial connection, or any other suitable communication channel, and the communication channel may be selected based on the component type in some implementations.

For example, the NC-SI channel may be based on cabling between management controller 212 and SmartNICs 206, which establishes a private, point-to-point network. Management controller 212 may act as a server, and SmartNIC 206 may perform a network boot based on a boot image shared by management controller 212. The boot image may then install any desired firmware updates.

Some components of SmartNICs 206 (e.g., the NIC BMC) may not support such a networked communication channel, however. In such instances, a serial connection may be used instead. In one implementation, the serial connection may be implemented using all or a portion of the same physical cabling as the RBT connection shown in FIG. 2. The serial connection may also include a multiplexer (MUX) to allow management controller 212 to communicate with any desired one of SmartNICs 206 at any given time.

In one embodiment, management controller 212 may broadcast the network path for firmware images to SmartNICs 206 through DHCPv6 solicit messages over the NC-SI PT private channel. These messages may be limited to a particular one of SmartNICs 206 based on the broadcast domain. Transfer of the firmware update payloads may occur in parallel in this embodiment.

In some embodiments, the installation of firmware updates according to this disclosure may be possible based on pre-existing trust relationships. For example, management controller 212 may authenticate (e.g., via username and password, authentication token, etc.) an administrator who wishes to install a firmware update, and SmartNICs 206 may have a preexisting trust relationship with management controller 212 based on the NC-SI PT private channel. Thus SmartNICs 206 may trust the administrator based on the authentication performed by management controller 212.

Figure 3A:
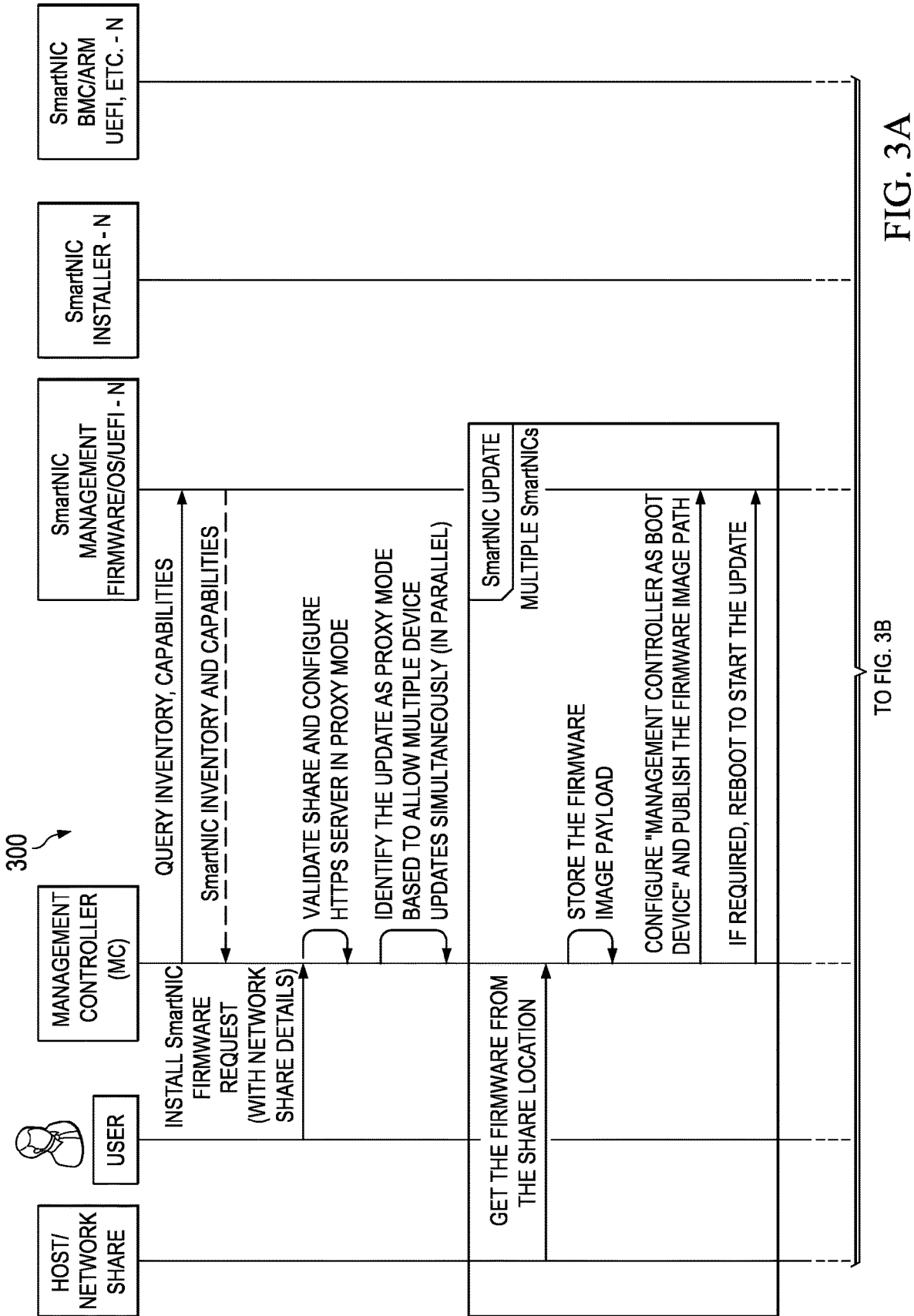
FIGS. 3A and 3B (collectively, FIG. 3) illustrates an example sequence diagram for a NIC firmware update, in accordance with embodiments of the present disclosure.
Figure 3B:
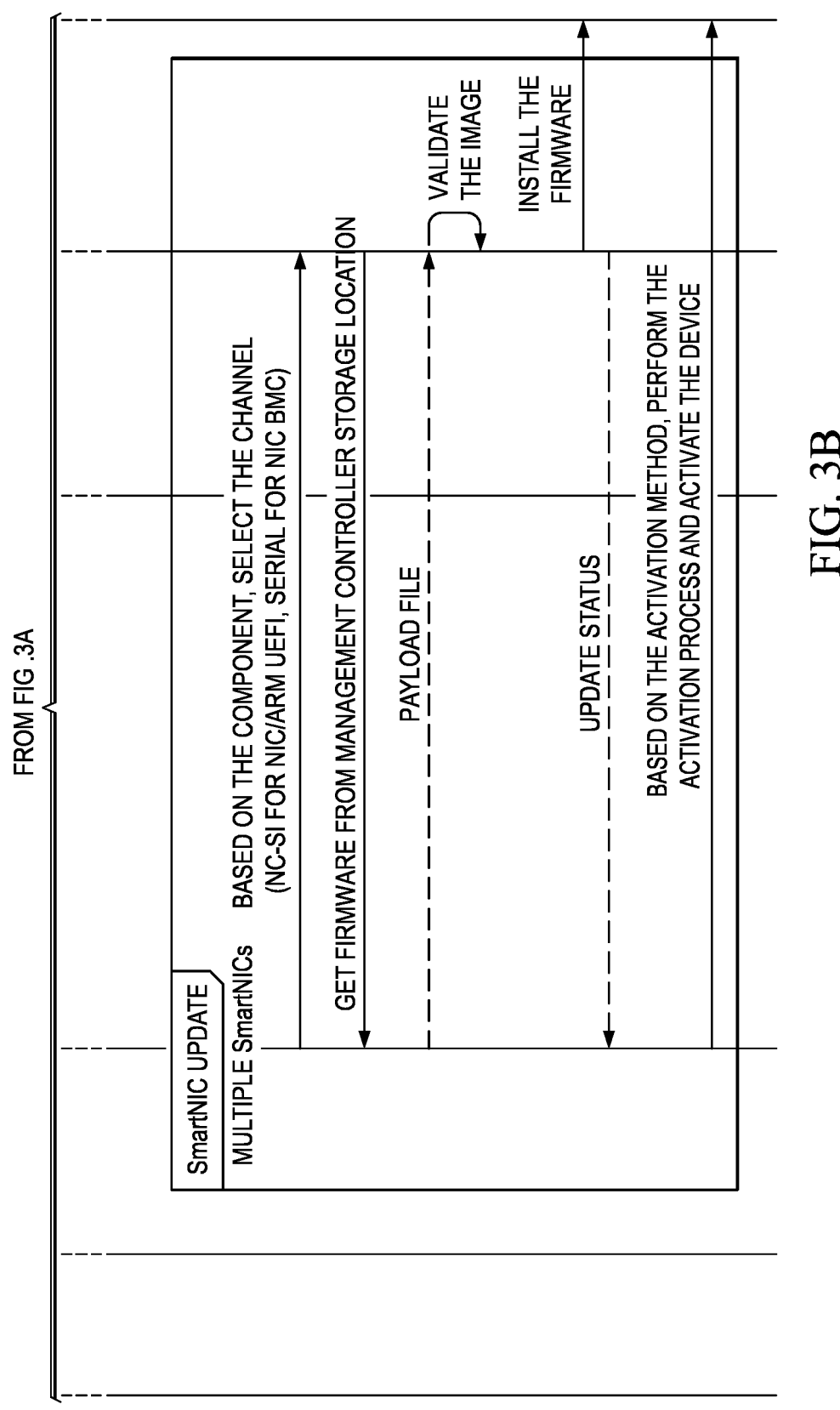

Turning now to FIGS. 3A and 3B (collectively, FIG. 3), a sequence diagram flow chart is shown of an example method 300 for updating firmware components within an information handling system including N SmartNICs (where N is an integer greater than or equal to 1), in accordance with some embodiments.

As shown, the host management controller may get the inventory of the internal components of each SmartNIC via Redfish or NC-SI based on the component. When a firmware update is triggered, an update package payload at the host or remote network share may exposes the SmartNIC firmware image.

The host management controller may enable the private Ethernet channel over NC-SI PT over RBT between the selected SmartNIC and the management controller. The management controller may store the payload in a temporary repository within its local storage.

Different types of firmware payload may operate in different manners in some embodiments. For example, for a SmartNIC UEFI update, the management controller may publish the firmware update image Uniform Resource Identifier ("URI") via DHCPv6 option #59 and allow multiple device updates to be performed simultaneously. The SmartNICs may then download the image, validate the image, and install the respective firmware components simultaneously in parallel.

For a SmartNIC BMC update, the management controller may enable a connection via a serial MUX, establish communication with the SmartNIC BMC, transfer the payload to the SmartNIC BMC, and activate the firmware update process.

For a NIC firmware update, the management controller may publish the firmware update image URI via DHCPv6 option #59 as described above. However, if this technique is not supported by the device, a legacy UEFI FMP method may be used instead.

Regardless of the type of update needed and the manner of transmitting the update to the SmartNIC, the management controller may also identify whether the update requires a host reboot and/or a SmartNIC reboot. For example, a SmartNIC UEFI update may require a reboot of the SmartNIC but not the host; a SmartNIC BMC update may not require any reboots; and a NIC firmware update may require both to reboot. Other types of updates may have other requirements with regard to reboots.

The management controller may also determine whether or not PCIe downstream port containment (DPC) should be enabled for the update. For example, a NIC firmware update may require DPC, while other types of updates may or may not.

Based on the determined requirements, the management controller may then perform the required reboot(s) and/or DPC when deploying the firmware update. In one embodiment, if DPC is required, then the management controller may send a system management interrupt (SMI) request to the host BIOS to take the selected SmartNIC offline. The SmartNIC may be identified by fully qualified device descriptor (FQDD) to the host BIOS in one implementation, and the host BIOS may then make the respective SmartNIC invisible to the host OS during the update process. Once the firmware is updated, the management controller may send another SMI request to bring the SmartNIC back online, and the host BIOS may then make the respective SmartNIC visible to the host OS again.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein, and/or any other system operable to implement the method.

Figure 4:
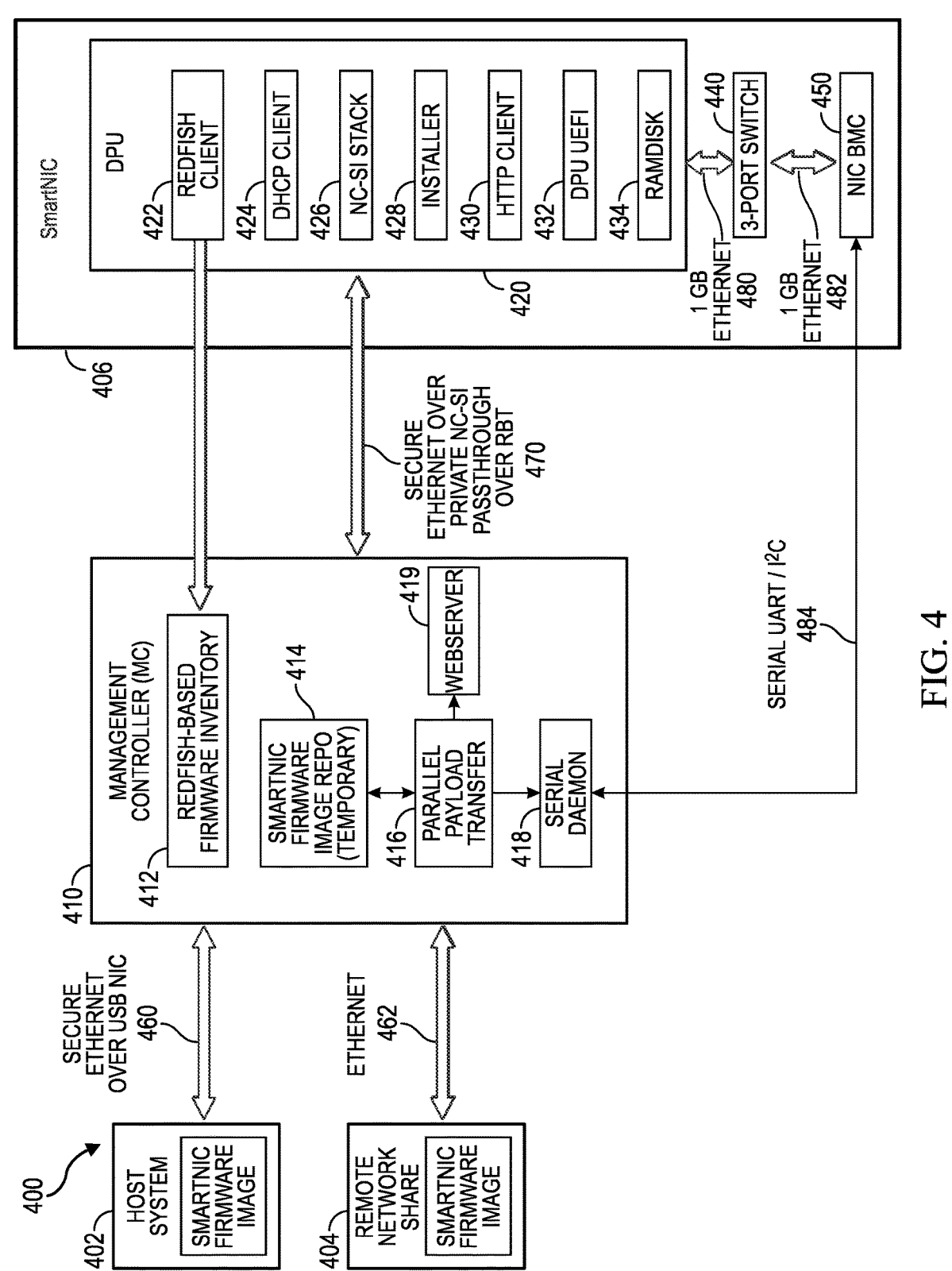
FIG. 4 illustrates a block diagram of selected components of an example information handling system depicting a management controller connectivity to a BMC of a Smart-NIC, in accordance with embodiments of the present disclosure.

Turning now to FIG. 4, this figure illustrates a block diagram of selected components of an example information handling system depicting a management controller connectivity to a BMC of a SmartNIC, in accordance with embodiments of the present disclosure. The description above with regard to FIGS. 2 & 3 described how, for a SmartNIC BMC 450 update, the management controller 410 would enable a connection via the serial daemon 418 that interfaces to the serial network connection 484 (e.g., universal asynchronous receiver/transmitter ("UART") or Inter-Integrated Circuit ("I$^2$C")). The management controller 410 would then establish communication with the SmartNIC BMC 450 via the serial connection 484, transfer the payload to the SmartNIC BMC vial the serial connection 484, and activate the firmware update process.

However, transferring a payload, such as a firmware update, via a serial connection is very time-consuming. Updating a rather large OpenBMC image on the NIC BMC 450 via the serial connection 484 can take upwards of 75 minutes, for example. In addition, because the NIC BMC can be based on Linux with a full TCP/IP stack and web interface, in some embodiments, the firmware probably needs to be updated on a very regular basis to address security (even if it is just because the software on the NIC BMC appears in an software bill of materials ("SBOM")).

Therefore, FIG. 4 illustrates an architecture where the management controller 410 does not have to use the serial connection to transfer the payload to the NIC BMC 450. While the management controller 410 might still use the serial connection 484 for controlling the update process, the payload transfer itself (e.g., the firmware update for the NIC BMC 450) can instead be accomplished through the NC-SI pass-through private channel 470 to the DPU 420 of the SmartNIC 406. The data of the payload can then be routed from the DPU 420 to the NIC BMC 450 via a 1 GB Ethernet connection (480, 482). Therefore, the payload (e.g., the firmware update payload) can use faster connections for transfer, rather than the very slow serial connection 484. FIG. 4 depicts a 3-port switch 440 in between the DPU 420 and the NIC BMC 450, according to some embodiments. However, in other embodiments, the 3-port switch might be removed, and there might be a direct Ethernet connection from the DPU 420 to the NIC BMC 450.

Figure 5:
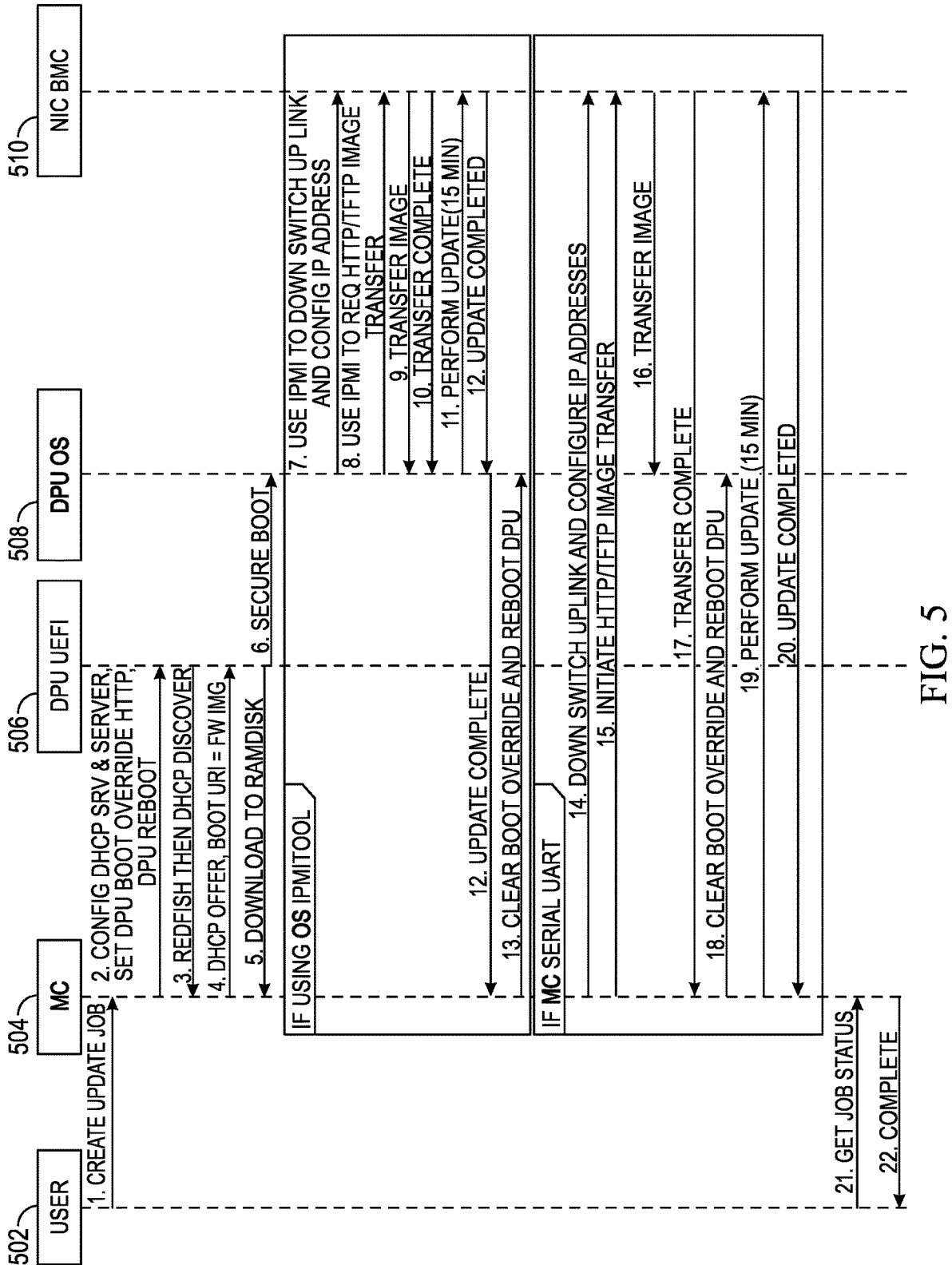
FIG. 5 illustrates an example sequence diagram for a first option of a NIC BMC firmware update, in accordance with embodiments of the present disclosure.
Figure 6:
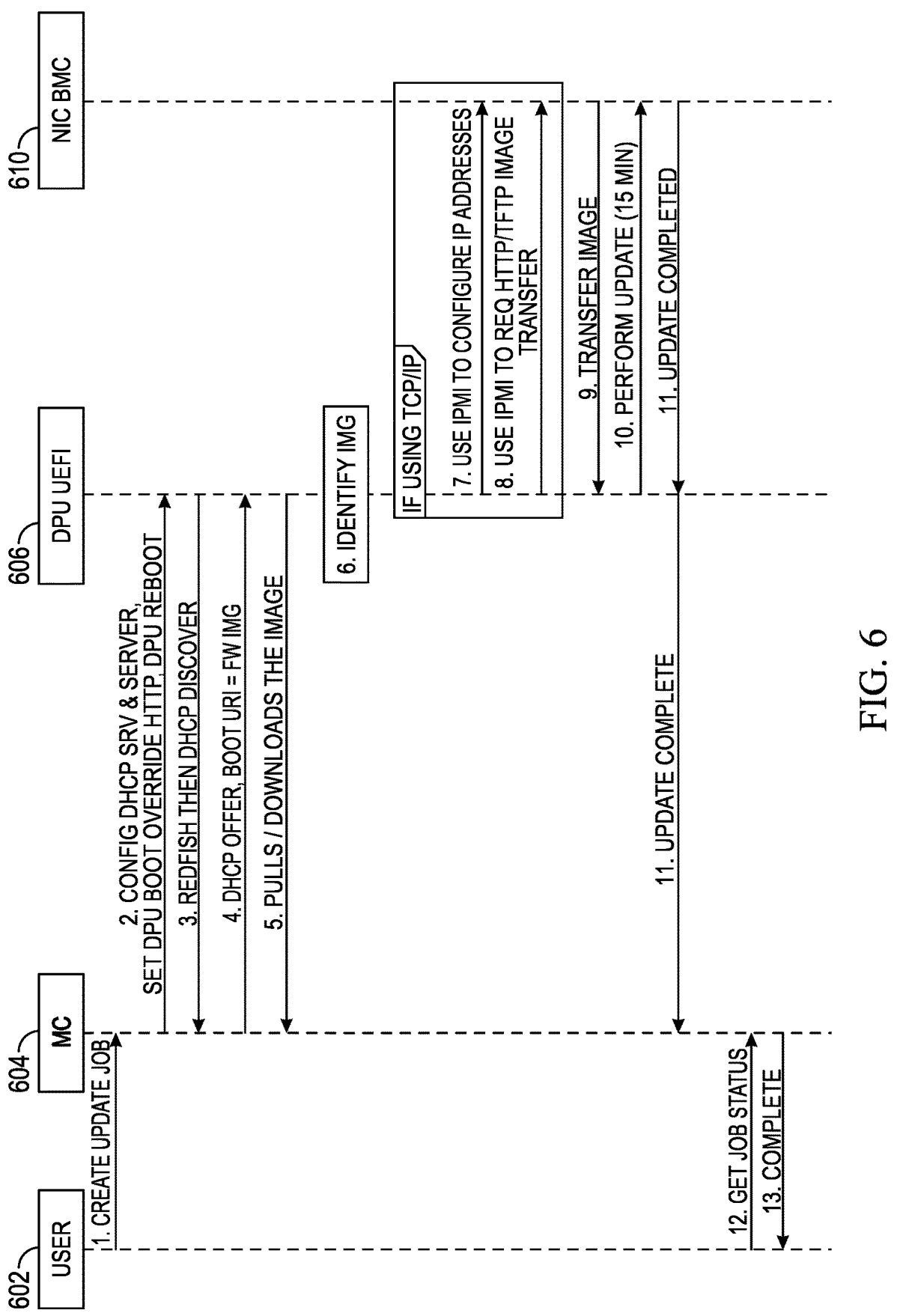
FIG. 6 illustrates an example sequence diagram for a second option of a NIC BMC firmware update, in accordance with embodiments of the present disclosure.
Figure 8:
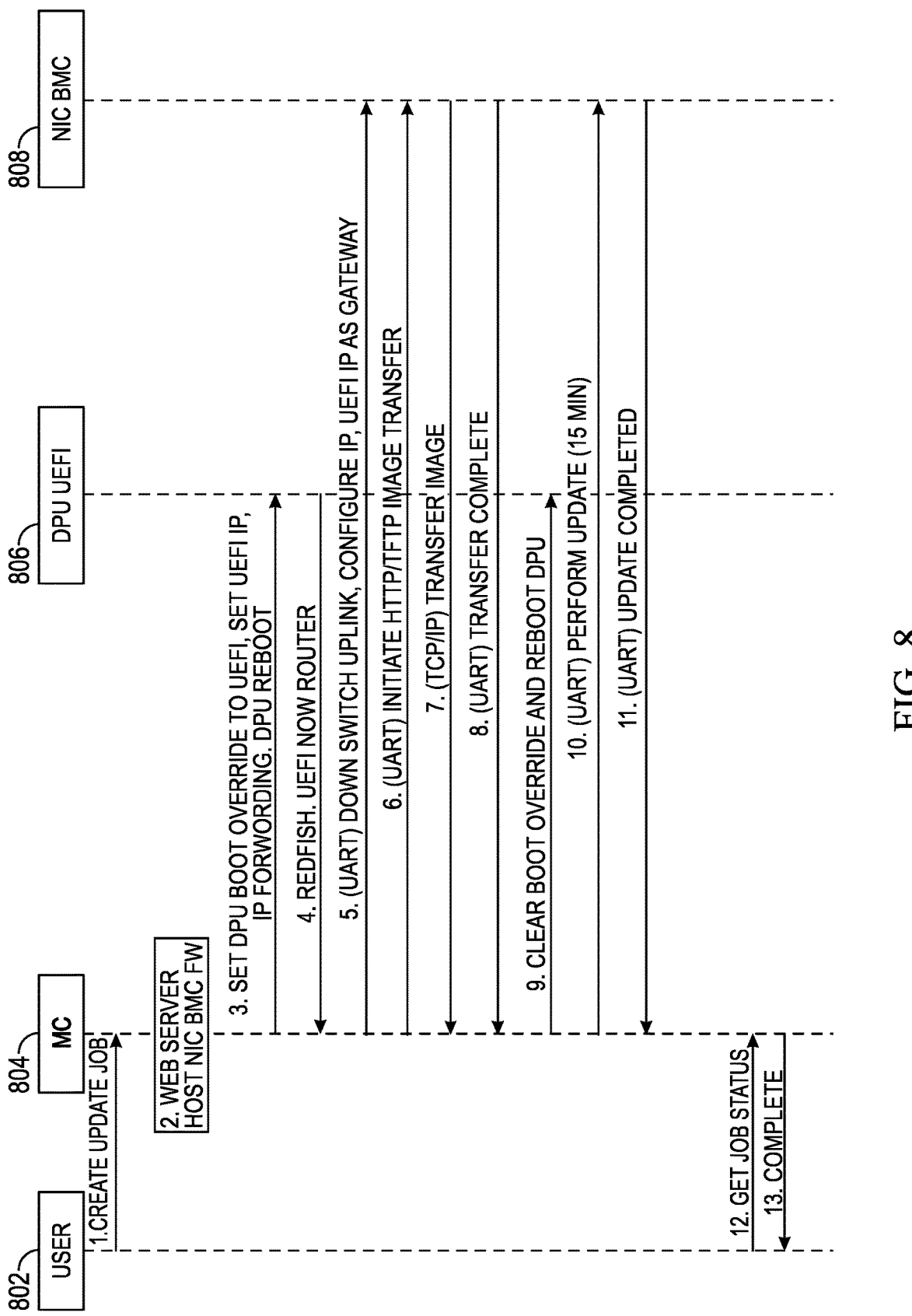
FIG. 8 illustrates an example sequence diagram for the third option of a NIC BMC firmware update, in accordance with embodiments of the present disclosure.

FIGS. 5, 6, and 8 illustrate three different methods or processes for transferring a payload with an ultimate destination of the NIC BMC 450, from the management controller 410 to the DPU 420 via the high-speed NC-SI pass-through private channel 470, and then to the NIC BMC via the 1 GB Ethernet connection (480, 482). However, before we discuss in detail the three different methods or processes for transferring the data through the DPU 420 to the NIC BMC 450, a little more description of the architecture of FIG. 4 is needed.

Similar to FIG. 2, information handling system 400 may include host system 402, management controller 410, and a SmartNICs 406. Information handling system 400 may further include or be communicatively coupled to remote network share 404. SmartNICs 406 may include various information handling resources, such as a DPU 420 and a NIC BMC 540. Any or all of these information handling resources may include firmware that may need to be updated from time to time. For example, the DPU might include a DPU UEFI 432, where UEFI firmware such as an ARM UEFI firmware for controlling a pre-boot environment of the SmartNIC may need to be updated from time to time. The DPU can include one or more cores, such as ARM cores.

Host system 402 may be coupled to the hardware of SmartNICs 406 via a communication channel such as Peripheral Component Interconnect Express (PCIe) in some embodiments. Management controller 410 may be coupled to host system 402 via one or more communication channels, such as secure Ethernet over USB NIC 460, a system management bus (SMBus), etc.

Management controller 410 may be coupled to the SmartNIC 406 via a network controller sideband interface (NC-SI) 470, which may be established over reduced media-independent interface (RMII) based transport (RBT), over PCIe vendor-defined message (VDM), or over SMBus, etc.

Embodiments of this disclosure may use firmware updates that are packaged according to a standardized update package payload. The update packages may be received from host system 402 and/or from remote network share 404. Management controller 410 may be coupled to remote network share 404 via one or more communication channels, such as Ethernet 462.

According to one embodiment, management controller 410 may perform a firmware inventory 412 of the different components of the SmartNICs 406. Management controller 410 may then provide firmware payload transfer and activation in parallel (e.g., by use of the parallel payload transfer component 416) based on the types of the components. The SmartNIC firmware inventory 412 may be collected based on the component type via a Redfish client 422 or by NC-SI in some embodiments. As shown, the payloads may be temporarily stored in a firmware image repository 414 at management controller 410. Payloads may then be transferred via NC-SI pass-through (PT) private channel 470, or any other suitable communication channel, and the communication channel may be selected based on the component type in some implementations. The DPU 420 includes an NC-SI stack 426 for operation of the NC-SI pass-through (PT) private channel 470.

For example, the NC-SI channel may be based on cabling between management controller 410 and SmartNICs 406, which establishes a private, point-to-point network. Management controller 410 may act as a webserver 419, with the DPU acting as an HTTP client 430. The SmartNIC 406 may then perform a network boot based on a boot image shared by management controller 410. The boot image may then install any desired firmware updates, such as by the use of an installer 428 package.

In one embodiment, management controller 410 may broadcast the network path for firmware images to Smart-NICs 406 through DHCPv6 solicit messages over the NC-SI PT private channel. SmartNICs 406 includes a DHCP client 424 for communication with the management controller 410 using this procedure.

In some embodiments, the installation of firmware updates according to this disclosure may be possible based on pre-existing trust relationships. For example, management controller 410 may authenticate (e.g., via username and password, authentication token, etc.) an administrator who wishes to install a firmware update, and SmartNIC 406 may have a preexisting trust relationship with management controller 410 based on the NC-SI PT private channel. Thus SmartNICs 406 may trust the administrator based on the authentication performed by management controller 410.

FIG. 5 illustrates an example sequence diagram for a first option of a NIC BMC firmware update, in accordance with embodiments of the present disclosure. The first option boots the cores (e.g., ARM cores) of the DPU to a firmware installer image of an operating system (e.g., Linux), where the operating system hosts the firmware image of the NIC BMC. In this example, we discuss the embodiments in which the cores are ARM cores, and in which the operating system is Linux. However, any other type of core, and any other type of operating system can be used, and the below discussion should not be construed as limiting.

In this first option the MC 410 reboots the DPU 420 and configures the ARM UEFI 432 to network boot to a utility Linux image. The utility Linux image will have services for DHCP, DNS, and file serving. The utility image will configure internal network to NIC and host the NIC BMC image. The image transfer and activation could be orchestrated by Intelligent Platform Management Interface ("IPMI") tools embedded in the image and a boot script, or could be orchestrated by the MC 410 over serial UART 484. The boot to the firmware installer image can be accomplished by: (a) If secure boot is enabled, the User or MC 410 can configure secure boot to validate the image and/or to sign the image; (b) If the IP address of the utility image file server is not fixed, a well know DNS alias or DNS SRV record can used to simplify network transfer of NIC BMC FW; (c) The MC 410 can orchestrate the update using auto-login on serial; and/or (d) NIC BMC update packages can be updated to contain the Linux utility wrapper, and the MC 410 can have logic to determine if this is an old NIC BMC update package that must be sent over serial or a new BMC update package that is done through network boot of UEFI.

Referring now specifically to FIG. 5, at step 1, the user 502 creates a FW update job and uploads the ARM Linux NIC BMC FW updater image. In some embodiments, this image must be securely booted. If the associated secure boot key is not already in the UEFI secure boot DB, then this can be part of the UEFI config in the next step. At step 2, the MC 504 configures it web server to host the ARM Linux image and sets the DHCPv6 boot URI option. It can set the ARM UEFI attributes pending values for boot override and secure boot keys if necessary, then can reboot the DPU. At step 3, the DPU 506 can get pending UEFI attribute values via redfish then network boot to MC using DHCPv6. At step 4, the DHCPv6 offer can contain the Boot URI of the ARM Linux NIC BMC FW updater image hosted on the MC. At step 5, the UEFI can download the ARM Linux NIC BMC FW updater image to RAMDISK 434. At step 6, the UEFI can securely boot the ARM Linux image.

Steps 7-13 cover the embodiments where the Linux image orchestrates the NIC BMC update using IPMI tools. These embodiments require minimal MC changes, and are more vendor and device agnostic, but result in a longer DPU downtime. At step 7, the startup script in the ARM Linux 508 will use IPMI tool over I$^2$C to tell the NIC BMC 510 to disable the internal 3-port switch uplink and configure the ARM and NIC BMC IP addresses on the internal network. In some embodiments, the ARM Linux can be multi-homed to the internal network to the NIC BMC and to the NC-SI private channel network with iDRAC. At step 8, the ARM Linux will start its own file server (HTTP, TFTP, etc.), then using IPMI tool instruct the NIC BMC 510 to transfer the image. At step 9, the NIC BMC 510 transfers the image.

At step 10, the NIC BMC 510 notifies the ARM Linux 508 that transfer is complete, or the ARM Linux 508 polls for a transfer status. At step 11, the ARM Linux instructs NIC BMC to validate and apply the update. In some embodiments, this operation can take 15 minutes. At step 12, the NIC BMC notifies the ARM Linux that update is complete, or the ARM Linux polls for update status. The ARM Linux then can use Redfish over NC-SI private channel to notify the MC the update job is complete. At step 13, the MC clears ARM UEFI boot override and performs graceful shutdown and reboot of the ARM, so that DPU can resume normal operation. After this step is completed then this flow of the sequence diagram jumps to step 21.

Steps 14-20 cover the embodiments where the MC 504 orchestrates the NIC BMC update using a UART serial connection. These embodiments can require more iDRAC changes, and can be more vendor and device specific, but can result in less DPU downtime. At step 14, the MC instructs the NIC BMC over UART to disable the internal 3-port switch uplink. In some embodiments, this could be done as early as step 2 in order to enhance security. The ARM can either provide DHCP service or come up at a known static IP. The MC can configure the NIC BMC for DHCP or static IP. At step 15, the ARM Linux automatically starts its file server (HTTP, TFTP, etc.). The MC then instructs the NIC BMC to transfer the image. At step 16, the NIC BMC transfers the image.

At step 17, the NIC BMC notifies the MC that the transfer is complete. At step 18, the MC clears the ARM UEFI boot override and performs a graceful shutdown and reboot of the ARM so that the DPU can resume normal operation. At step 19, the MC instructs the NIC BMC to validate and apply the update. In some embodiments, this operation can take 15 minutes. At step 20, the NIC BMC notifies the MC that the update is complete. The MC can update the job to complete. At step 21, the User polls the job status. At step 22, the MC returns job complete to the user.

FIG. 6 illustrates an example sequence diagram for a second option of a NIC BMC firmware update, in accordance with embodiments of the present disclosure. For the second option, the DPU UEFI stores, hosts, and forwards the firmware image of the NIC BMC. This second option is similar to option 1 except the DPU UEFI hosts the image instead of ARM Linux image. This can be slightly faster since it does not require transfer and boot of the Linux image, but requires significant changes to the UEFI. Just like in option 1 either the UEFI can orchestrate the update, or the MC can orchestrate the update with the same tradeoffs mentioned in option 1. As in option 1, in this example, we also discuss the embodiments in which the cores are ARM cores, and in which the operating system is Linux. However, any other type of core, and any other type of operating system can be used, and the below discussion should not be construed as limiting.

In this second option, the MC 604 reboots DPU 606 into UEFI, creates a job for DPU UEFI 606 to update the NIC BMC 610. The DPU UEFI 606 is then responsible for transferring the image to the NIC BMC 610. The DPU UEFI 606 either downloads the image to a scratch pad, or it proxies the update image. This store and forward solution can be accomplished by: (a) Adding a DPU UEFI I²C driver to send the NIC BMC IPMI commands either without credential or in-band credential; (b) If using TCP/IP for transfer, employing static IP assignment or Network services (e.g., DHCP or Router Advertisement Daemon ("RADVD")) for IP address assignment between the ARM and the NIC BMC; (c) Pushing or pulling the firmware image to the NIC BMC. The UEFI can serve the file (HTTP/TFTP) and tell the NIC BMC to download it, or UEFI can upload it to NIC BMC; (d) The DPU UEFI can orchestrate the transfer/validate/apply of the NIC BMC and report a success or failure to the MC.

Referring now specifically to FIG. 6, at step 1, the user 602 creates a FW update job and uploads NIC BMC FW update package to the MC 604. At step 2, the MC 604 configures a web server to host the NIC BMC firmware, and sets the DHCPv6 boot URI option. The MC 604 can set the ARM UEFI 606 attributes pending values for boot override, and then can reboot the DPU. At step 3, the DPU 606 gets pending UEFI attribute values via redfish, and then network boots to the MC using DHCPv6. At step 4, the DHCPv6 offer contains the Boot URI of the NIC BMC firmware hosted on the MC. At step 5, the DPU UEFI 606 downloads NIC BMC firmware.

At step 6, the DPU UEFI 606 identifies the image as NIC BMC firmware. At step 7, the DPU UEFI 606 uses the IPMI to tell the NIC BMC 610 to disable the internal 3-port switch uplink, and to configure the ARM and NIC BMC IP addresses on the internal network. At step 8, the DPU UEFI can start its own file server (HTTP, TFTP, etc.), and then use IPMI to instruct the NIC BMC 610 to transfer the image. At step 9, the NIC BMC 610 transfers the image. At step 10, the DPU UEFI 606 instructs the NIC BMC 610 to validate and apply the update. At step 11, the DPU UEFI 606 uses Redfish over NC-SI private channel to notify the MC 604 that the update job is complete. Then it continues normal boot of the DPU. At step 12, the user 602 polls job status. At step 13, the MC 604 returns job complete.

Figure 7:
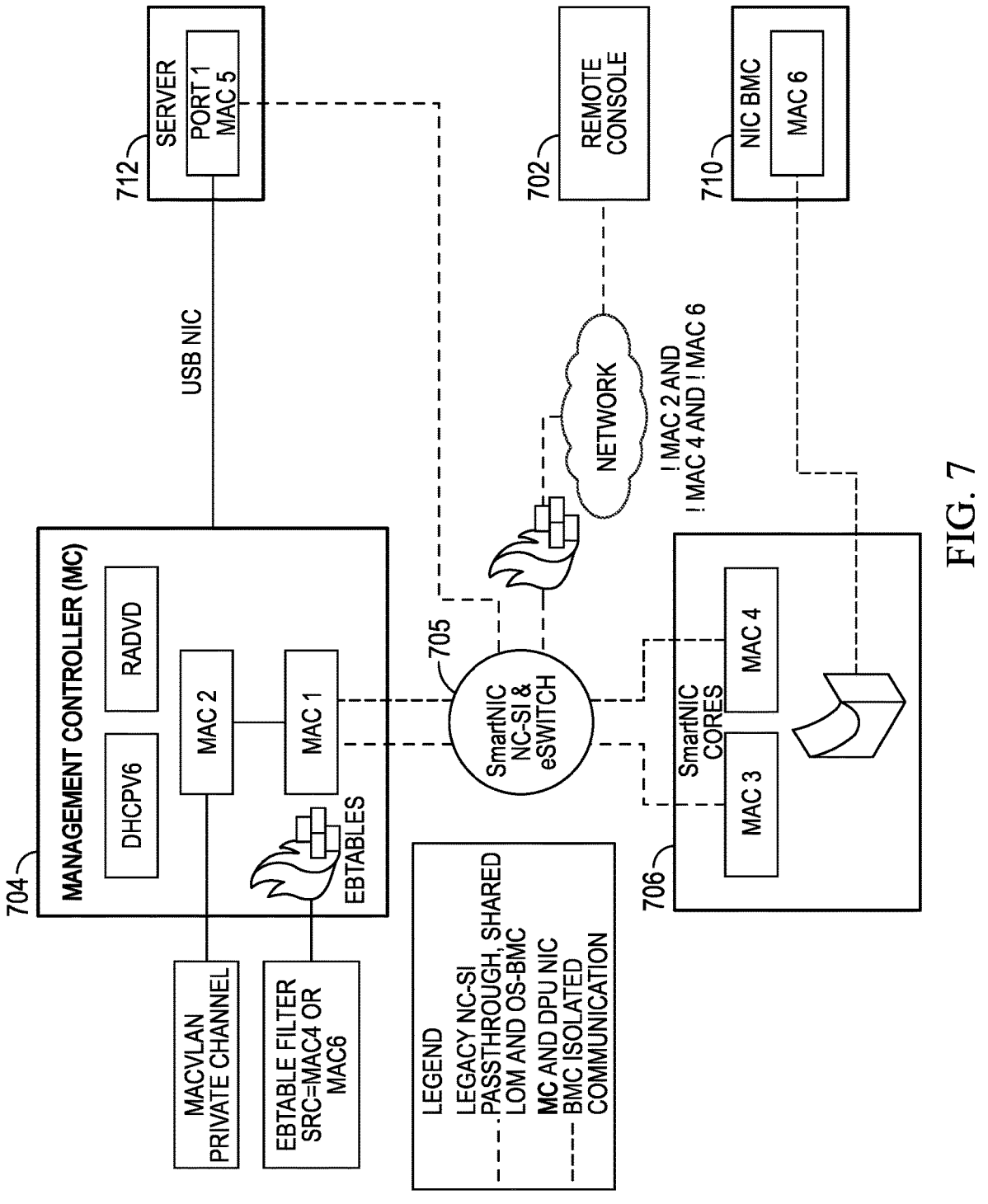
FIG. 7 illustrates a block diagram of selected components of an example information handling system for a third option of a NIC BMC firmware update, depicting a NC-SI private channel with an DPU UEFI bridge from the management controller to the NIC BMC, in accordance with embodiments of the present disclosure.

FIG. 7 illustrates a block diagram of selected components of an example information handling system for a third option of a NIC BMC firmware update, depicting a NC-SI private channel with an DPU UEFI bridge from the management controller 704 to the NIC BMC 710, in accordance with embodiments of the present disclosure.

For the third option, the DPU UEFI acts a bridge or router 706, and the management controller 704 hosts the firmware image. In this third option, the MC 704 can be the file server for the NIC BMC 710 FW, and the ARM cores 706 can be an L2 bridge or an L3 router that creates IP connectivity between the MC 704 and the NIC BMC 710. The L3 routing option is the simplest since it does not require the MAC filter changes and eSwitch programming shown as in FIG. 7.

Another option is to boot the ARM cores to a Linux image that provided the routing. This would be similar to option 1, but the Linux image could be much smaller since routing is a basic kernel function. As in options 1 and 2, in this example, we also discuss embodiments in which the cores are ARM cores, and in which the operating system is Linux. However, any other type of core, and any other type of operating system can be used, and the below discussion should not be construed as limiting.

More specifically, for this third option, the MC 704 can reboot the DPU into UEFI mode, and can tell the DPU UEFI 706 to be a bridge or router 706 between the NC-SI private channel 705 and the internal management switch. The MC 704 can provide a Layer 3 IP assignment on the NC-SI private channel network. The MC 704 will host NIC BMC FW via its HTTP service, then connect to the NIC BMC 710 over the UART connection (484 of FIG. 4) and instruct the NIC BMC 710 to download and install the FW.

This solution can be accomplished by: (a) The DPU UEFI 706 acts as either a bridge or router between the NC-SI private channel 705 and a 1 Gb connection to the NIC BMC 710; (b) The uplink port of the 3-port switch 440 is disabled; (c) If the UEFI is a bridge, then the MC 704 can discover the NIC BMC 710 MAC address over UART, and update the ebtables filter to allow packets from both the ARM 706 private channel MAC and NIC BMC 710 MAC. Ebtables is an application program used to set up and maintain the tables of rules (inside the Linux kernel) that inspect Ethernet frames. It is analogous to the iptables application, but differs in that it operates predominantly not at the third (networking) level, but at the second (link) level of the networking stack; (d) If the UEFI is a bridge, then the DPU UEFI can set the private channel packet filter to promiscuous mode, or add the NIC BMC MAC as a secondary MAC, or add flow rules so the eSwitch 705 will route packets to the correct packet filter. (e) If the UEFI is a bridge, then a stateful DHCPv6 server on the MC IP address pool can be updated to 2 addresses; (f) If the UEFI is a router, then the network between the ARM 706 and the NIC BMC 710 can use well known static addresses, or else the UEFI can provide a DHCP server on the ARM to NIC BMC network.

FIG. 8 illustrates an example sequence diagram for the third option of a NIC BMC firmware update, in accordance with embodiments of the present disclosure. At step 1 of FIG. 8, the user 802 creates a FW update job with the MC 804, and uploads the NIC BMC FW update package. At step 2, the MC 804 configures a webserver 419 to host the NIC BMC FW. At step 3, the MC 804 sets the ARM UEFI attributes pending values for boot override, and the UEFI IP on the ARM to the NIC BMC network. The MC 804 performs a graceful shutdown and reboots the DPU. At step 4, the DPU 806 gets pending UEFI attribute values via redfish and configures itself as a router between the NC-SI private channel and the ARM to NIC BMC network. At step 5, the MC 804 instructs the NIC BMC 808 over UART to disable the internal 3-port switch uplink. In some embodiments, this could be done as early as step 2 to enhance security). The MC 804 then configures the NIC BMC IP and sets the UEFI IP as the default gateway. At step 6, the iDRAC instructs the NIC BMC to transfer the image from iDRAC file server. At step 7, the NIC BMC transfers the image.

At step 8, the NIC BMC 808 notifies the MC 804 that the transfer is complete. At step 9, the MC 804 clears the ARM UEFI boot override and performs a graceful shutdown and reboot of the ARM 806 so that DPU can resume normal operation. At step 10, the MC 804 instructs the NIC BMC to validate and apply the update. In some embodiments, this operation can take 15 minutes. At step 11, the NIC BMC 808 notifies the MC 804 that the update is complete. The MC then updates the job to complete. At step 12, the user 802 polls for a job status. At step 13, the MC 804 returns job complete.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Further, reciting in the appended claims that a structure is "configured to" or "operable to" perform one or more tasks is expressly intended not to invoke 35 U.S.C. 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

All examples and conditional language recited herein are intended for pedagogical objects to aid the reader in under- standing the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

The invention claimed is:

1. An Information Handling System (IHS), that com- prises:
   a management controller (MC); and
   a Network Interface Controller (NIC) coupled to the MC, wherein the NIC comprises a baseboard management controller (BMC) coupled to a processing unit, wherein the MC is configured to:
      obtain a firmware update image usable by the NIC BMC;
      transmit the firmware update image to the processing unit, wherein the processing unit is configured to transmit the firmware update image to the NIC BMC; and
      publish a location of the firmware update image via Dynamic Host Configuration Protocol version 6 (DHCPv6).

2. The IHS of claim 1, wherein the MC comprises a first out-of-band (OOB) management connection.

3. The IHS of claim 2, wherein the NIC further comprises a second OOB management connection, and wherein the second OOB management connection is unavailable.

4. The IHS of claim 1, wherein the network interface controller is a SmartNIC.

5. The IHS of claim 1, further comprising a serial con- nection between the MC and the NIC BMC, wherein a transmission of the firmware update image to the NIC BMC via the processing unit is faster than a transmission of the firmware update image to the NIC BMC via the serial connection.

6. The IHS of claim 1, wherein the MC is further configured to provide a utility operating system image to the processing unit, wherein the processing unit is configured to boot from the utility operating system image, and wherein the utility operating system image comprises the firmware update image.

7. The IHS of claim 6, wherein the processing unit is configured to start a file server hosted by the processing unit.

8. The IHS of claim 7, wherein the processing unit is configured to instruct the NIC BMC to retrieve the firmware update image from the file server.

9. The IHS of claim 7, wherein the MC is further configured to instruct the NIC BMC to retrieve the firmware update image from the file server.

10. The IHS of claim 1, wherein the MC is further configured to:
   reboot the processing unit into a Unified Extensible Firmware Interface (UEFI) mode; and
   create a job for the UEFI mode of the processing unit to download the firmware update image, and to update the NIC BMC.

11. The IHS of claim 1, wherein the MC is configured to:
   reboot the processing unit into a Unified Extensible Firmware Interface (UEFI) mode;
   configure the processing unit as a router between the MC and the NIC BMC; and
   instruct the NIC BMC to transfer the firmware update image from the MC via the router.

12. The IHS of claim 1, wherein the firmware update image is retrieved from a host system.

13. The IHS of claim 1, wherein the firmware update image is retrieved from an external IHS via a network share.

14. The IHS of claim 1, wherein the firmware update image comprises at least one of: (a) network interface controller firmware configured to control network function- ality of the network interface controller; (b) BMC firmware configured to control an internal management controller of the network interface controller; or (c) Unified Extensible Firmware Interface firmware configured to control a pre- boot environment of the NIC.

15. A method, comprising:
   obtaining, at a processing unit of a Network Interface Controller (NIC), a firmware update image from a management controller (MC) of an Information Han- dling System (IHS) to which the NIC is coupled, wherein the MC is configured to publish a location of the firmware update image via Dynamic Host Configu- ration Protocol version 6 (DHCPv6); and
   transmitting, from the processing unit to a baseboard management controller (BMC) of the NIC, the firm- ware update image.

16. The method of claim 15, further comprising:
   obtaining, by the NIC BMC, the firmware update image from the processing unit of the NIC; and
   applying, by the NIC BMC, the firmware update image, the firmware update image being configured to install an update to the firmware of the NIC BMC.

17. The method of claim 15, further comprising:
   obtaining, by the processing unit of the NIC, a utility operating system image from the MC; and
   booting, by the processing unit of the NIC, from the utility operating system image, wherein the utility operating system image comprises the firmware update image.

18. A non-transitory, computer-readable medium config- ured with programming instructions stored thereon that upon execution by a Baseboard Management Controller (BMC) of a Network Interface Controller (NIC), cause the BMC to:
   obtain a firmware update image from a processing unit of the NIC, wherein the processing unit is configured to receive the firmware update image from a management controller (MC) of an Information Handling System (IHS) to which the NIC is coupled, wherein the MC is configured to publish a location of the firmware update image via Dynamic Host Configuration Protocol ver- sion 6 (DHCPv6); and
   install the firmware update image.

19. The non-transitory, computer-readable medium of claim 18, wherein the processing unit of the NIC obtains a utility operating system image from the MC, wherein the processing unit of the NIC is configured to boot from the utility operating system image, and wherein the utility operating system image comprises the firmware update image.

* * * * *